United States Patent Office 3,420,913
Patented Jan. 7, 1969

3,420,913
ACTIVATED CHARCOAL IN RUBBER COMPOUNDING
Henry E. Railsback, Bartlesville, Okla., assignor to Phillips Petroleum Company, a corporation of Delaware
No Drawing. Filed Feb. 7, 1967, Ser. No. 614,407
U.S. Cl. 260—763    7 Claims
Int. Cl. C08c *11/18*

ABSTRACT OF THE DISCLOSURE

Small amounts of activated charcoal are added to rubber stock containing carbon black. This composition has sufficient green tensile to facilitate fabrication of items such as radial ply tires which require greater strength to hold the cords in place during curing.

This invention relates to elastomeric compositions containing activated charcoal and carbon black.

Activated charcoal was first used as a filler in rubber stock many years ago. However, because of the fact that its use resulted in a rubber having properties which were undesirable for many applications, its use has been limited to a few specialty items where these properties are advantageous. U.S. 2,098,429, for instance, discloses the use of 15 to 200 parts by weight of activated charcoal per 100 parts of rubber in a hard rubber composition for steering wheels. It is also used to make a rubber stock for a buffer zone in white side wall tires. However, it has never found general utility in tire stocks because the properties it imparts to the stock make it entirely unsuitable as a tire carcass stock.

It is an object of this invention to provide a rubber composition containing a small amount of activated charcoal in conjunction with carbon black which is suitable for tire carcasses.

It is a further object of this invention to provide a rubber composition having greatly improved green tensile without any significant sacrifice in heat build-up or cured tensile strength.

In accordance with this invention a rubber composition containing a small amount of activated charcoal in combination with the usual carbon black and other ingredients has greatly improved green tensile without any significant sacrifice in heat build-up or cured tensile. This surprising discovery is of particular importance because of the advent of radial ply tires where greater green tensile is necessary to hold the cords in place during curing.

The improvement in green tensile, as achieved by the instant invention, is of utility in other applications besides radial ply tires. For instance, it improves the handling of compounded materials in the fabrication of belts and the like.

The amount of activated charcoal utlized in the practice of this invention can vary from 0.1 to 10 phr. (throughout the specification and claims phr. is used to designate parts by weight per hundred parts by weight of rubber), but is preferably from 1 to 5 phr. Any activated charcoal having a small particle size can be used. The surface area as measured by nitrogen absorption should be between 300 and 2000 $m.^2/g.$ or higher, preferably at least 600 $m.^2/g.$ Such charcoal can be prepared by methods well known in the art from such materials as wood, bone, nut shells, lignin, coal, petroleum residues and carbon black. The charcoal must have a particle size of less than 100 mesh, preferably less than 300 mesh, more preferably less than 1 micron. By mesh is meant U.S. Bureau of Standards, Standard Screen Series, 1919.

The amount of the carbon black component in the compositions can vary over a wide range. For instance as little as 10 or as much as 400 phr. of carbon black can be used. Generally about 20 to 50 phr. is used. Any of the carbon blacks conventionally used as fillers or reinforcing agents in rubber such as furnace blacks, channel blacks, lamp blacks and thermal blacks are suitable for use in the practice of this invention.

Rubbers suitable for the practice of this invention include natural rubber as well as any of the synthetic rubbers known in the art, such as the emulsion-polymerized butadiene or butadiene/styrene rubbers, the solution-polymerized butadiene or butadiene/styrene rubbers—including the high-cis polybutadienes for example, and the like. The synthetic rubber structure can be block, random, radial teleblock, or a mixture thereof. Other rubbers that can be used are the ethylene-propylene copolymers or terpolymers with conjugated or non-conjugated diene monomers.

The compositions of this invention can contain an effective amount of curatives or vulcanizing agents and can be cured in a conventional manner.

The compositions of this invention can also contain other additives conventionally added to rubber stocks such as fillers, pigments, antioxidants, accelerators, plasticizers, retarders, oil, and the like.

The carbon black, activated charcoal, and any other ingredients can be incorporated by any means conventionally used for compounding rubber stocks, such as a roll mill, a Banbury mixer or by solution blending, and the like.

EXAMPLE I

Blends of natural rubber with 40 phr. carbon black and varying amounts of activated charcoal were made on a Banbury mixer. The results are reported in Table I.

TABLE I

|  | Control 1 | Run 1 | Run 2 | Run 3 | Control 2 | Control 3 |
|---|---|---|---|---|---|---|
| Natural rubber | a 100 | 100 | 100 | 100 | 100 | 100 |
| IRB No. 2 blend HAF b | 40 | 40 | 40 | 40 | 40 | 40 |
| Zinc oxide | 5 | 5 | 5 | 5 | 5 | 5 |
| Stearic acid | 2 | 2 | 2 | 2 | 2 | 2 |
| Pine tar | 3 | 3 | 3 | 3 | 3 | 3 |
| Philrich c | 5 | 5 | 5 | 5 | 5 | 5 |
| Flexamine d | 1 | 1 | 1 | 1 | 1 | 1 |
| BLE-25 e | 1 | 1 | 1 | 1 | 1 | 1 |
| Sulfur | 2.2 | 2.2 | 2.2 | 2.2 | 2.2 | 2.2 |
| Santocure f | 0.9 | 0.9 | 0.9 | 0.9 | 0.9 | 0.9 |
| DPG g | 0.2 | 0.2 | 0.2 | 0.2 | 0.2 | 0.2 |
| Activated charcoal h | 0 | 1 | 2.5 | 5 | 15 | 30 |
| Processing properties | | | | | | |
| Mix time, min | 6 | 6 | 6 | 6 | 5 | 6 |
| Dump temp., F | 270 | 285 | 300 | 300 | 310 | 290 |
| Banding i | 10 | 10 | 10 | 10 | 6 | 0 |
| Green tensile, psi j | 58 | 88 | 91 | 137 | 310 | 600 |
| Appearance k | 10 | 10 | 10 | 10 | 10 | 10 |
| Physical properties of cured stock l | | | | | | |
| 300% modulus, p.s.i. m | 1,090 | 1,185 | 1,190 | 1,410 | 1,690 | ---------- |
| Tensile, p.s.i. n | 4,480 | 4,065 | 3,780 | 3,600 | 2,490 | 1,620 |
| ΔT., F. o | 35.5 | 35.0 | 35.8 | 36.7 | 47.6 | 117.2 | a All values are parts by weight.
b High-abrasion furnace black.
c A highly-aromatic extender oil.
d A physical mixture of a complex diarylamine-ketone reaction product (65%) and N,N'-diphenyl-p-phenylene-diamine (35%).
e High-temperature reaction product of diphenylamine and acetone.
f N-cyclohexyl-2-benzothiazolesulfenamide.
g Diphenylguanidine.
h Nuchar CEE-N; highly activated vegetable carbon; surface area 689 square meters per gram; particle size: 91–99% less than 100 mesh; 70–90% less than 200 mesh; 50–75% less than 325 mesh.
i 0–10; 10=Best.
j ASTM D 412–62T. Crosshead speed=20 inches per minute.
k Of extrudate: 3–12; 12=Best.
l 45 minute cure at 293 F.
m ASTM D 412–62T. Crosshead speed=20 inches per minute.
n ASTM D 412–62T. Crosshead speed=20 inches per minute.
o ASTM D 623–62, Method A, Goodrich Flexometer, 143 lb/sq. in. load, 0.175-inch stroke. Test specimen is a right circular cylinder 0.7-inch in diameter and 1 inch high.

A comparison of Runs 1, 2, and 3 with Control 1 of Example I reveals that the combination of carbon black with a small amount of activated charcoal brings about a dramatic improvement in green tensile strength. The 300% modulus is also improved slightly. Yet this improvement is achieved without the severe deterioration in cured tensile, heat generation (ΔT), and banding which Control Runs 2 and 3 reveal occurs at just slightly higher levels of activated charcoal.

EXAMPLE II

The uncured blend of Run 1 of Example I is used as the carcass stock of a radial ply tire. This stock is calendered in thin sheets onto both sides of a rayon tire cord fabric. This rubber covered fabric is then used to make the basic body plies of a radial ply tire.

While this invention has been described in detail for the purpose of illustration, it is not to be construed as limited thereby but is intended to cover all changes and modifications within the spirit and scope thereof.

I claim:

1. An elastomeric composition comprising (1) rubber (2) from 10 to 400 phr. of carbon black and (3) from 0.1 to 10 phr. of activated charcoal having a surface area as measured by nitrogen absorption of from 300 to 2000 square meters per gram and a particle size less than 100 mesh.

2. A composition according to claim 1 wherein said carbon black is present in an amount from 20 to 50 phr., said activated charcoal has a surface area of at least 600 square meters per gram and at least 50 percent of said charcoal has a particle size of less than 325 mesh.

3. A composition according to claim 2 wherein said rubber is natural rubber and said carbon black is a high abrasion furnace black.

4. A composition according to claim 1 wherein said activated charcoal is present in a concentration within the range of 1 to 5 phr.

5. A process for producing a cured elastomeric product comprising: blending rubber with from 10 to 400 phr. of carbon black, from 0.1 to 10 phr. of activated charcoal having a surface area as measured by nitrogen absorption of from 300 to 2000 square meters per gram and a particle size of less than 100 mesh, and an effective amount of curatives; and subjecting the resulting blend to curing conditions.

6. The method according to claim 5 wherein said carbon black is present in an amount from 20 to 50 phr., said activated charcoal has a surface area of at least 600 square meters per gram and at least 50 percent of said charcoal has a particle size of less than 325 mesh.

7. The method according to claim 6 wherein said rubber is natural rubber and said carbon black is a high abrasion furnace black.

References Cited

UNITED STATES PATENTS

| 1,433,099 | 10/1922 | Rose | 152—330 |
| 1,519,268 | 12/1924 | Schnell | 152—330 |
| 2,098,429 | 11/1937 | Morron | 106—23 |
| 3,302,680 | 2/1967 | Rote et al. | 260—41.5 |

MORRIS LIEBMAN, *Primary Examiner.*

S. L. FOX, *Assistant Examiner.*

U.S. Cl. X.R.

260—41.5; 152—330